April 25, 1933.  J. F. DUFFY  1,905,372

PLATE COVERING AND ATTACHMENT

Filed Sept. 16, 1929

Inventor
James Francis Duffy
By Linvane and
Van Antwerp
Attorneys

Patented Apr. 25, 1933

1,905,372

UNITED STATES PATENT OFFICE

JAMES FRANCIS DUFFY, OF HOLLAND, MICHIGAN, ASSIGNOR TO DUFFY MANUFACTURING COMPANY, OF HOLLAND, MICHIGAN, A CORPORATION OF MICHIGAN

PLATE COVERING AND ATTACHMENT

Application filed September 16, 1929. Serial No. 392,777.

This invention relates to a construction of a plate and covering means therefor, together with a novel means for attaching the plate to any place where it is to be used.

In practice, step plates on automobile running boards or wearing plates attached to mats in automobiles to protect the mats from excessive wear are used to a considerable extent. In many cases a protective covering for part of the mat consists merely of an auxiliary thickness of fabric of different character than the mat sewed or otherwise attached to the mat. Such coverings are very subject to wear and while the mat itself may be protected, the protective covering will wear through and become ragged and unsightly.

With my invention, a metal plate is to be completely covered with rubber at both sides and at its edges and the rubber covering permanently and inseparately connected to the plate. Novel means are provided integral with the plate which extends through the rubber covering at one side and which may be passed through a mat or other member to which the plate is secured and then bent over at the underside, thereby making a secure connection but one which can be released so as to remove the plate and replace it with a new one should it ever become necessary or desirable.

It is a primary object and purpose of the present invention to provide a simple, novel and economically constructed plate of the character set forth, or to provide novel attaching means for rubber covered plates or rubber blocks which serves as protective means to resist wear or rubbing against the device or member over which they are placed.

Figure 1:
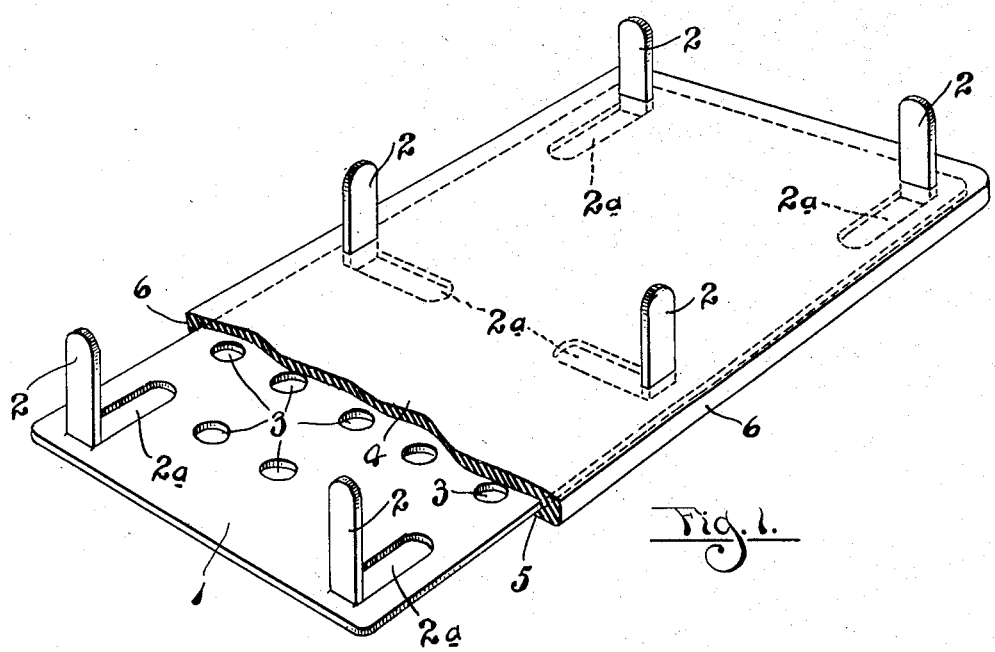

An understanding of the invention may be had from the following description taken in connection with the accompanying drawing, in which, Fig. 1 is a perspective view showing the covered plate construction of my invention, a part of the covering being removed for a better disclosure of structure.

Figure 2:
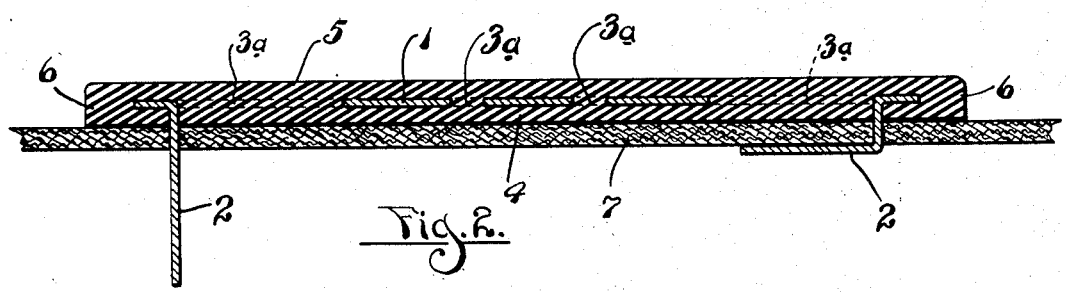
Figure 3:
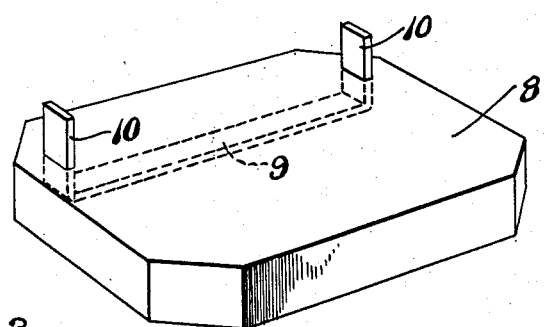

Fig. 2 is a transverse section through the plate showing the same as it is applied and attached to a mat, and Fig. 3 is a perspective view of a protective block of rubber which may be similarly secured; for instance in the recess formed in a front fender of an automobile in which a spare tire is partly located to protect the finish of the fender from rubbing engagement with the tire.

Like reference characters refer to like parts in the different figures of the drawing.

In the constructions illustrated, a sheet metal plate 1 of suitable outline is provided, from which a plurality of tongues 2 are struck and bent outwardly to extend at right angles to the plate. This leaves openings 2a in the plate where the metal is cut therefrom to make the tongues 2. Other openings 3 are made through the plate, preferably of circular form and spaced short distances apart.

The rubber covering on the plate covers the lower side, as indicated at 4, the upper as indicated at 5, while the plate at all of its edges is covered by edge portions 6 of the rubber integral with the lower and upper sides 4 and 5. And connecting portions of rubber between the upper and lower sides extend through the openings 2a and 3 as indicated at 3a in Fig. 2. This makes a very secure connection of the rubber covering to the plate and one which can not be removed without destruction of the covering. It is evident that the tongues 2 pass through the underside 4 of the rubber covering and project a distance beyond the same.

A rubber covered plate thus constructed may be very readily attached to a mat, shown at 7 in Fig. 2, by merely inserting the tongues 2 through the mat and then bending the projecting ends of the tongue against the underside of the mat. This is shown at the right in Fig. 2. In the same way the tongues may pass through the covering on a running board of an automobile whereby the plate of my invention is readily available for use as a step plate to protect the running board mat or from wear. The tongues can be readily forced through various fabric, or slits may be cut for their passage. In attaching the plate to sheet metal it is necessary merely to provide proper slots in the metal for the passage of the tongues, after which the same may be bent against the underside of the member through which they have passed, thereby securing the plate in place. It is also evident that should one wish to replace a plate which has had considerable service and has become worn, the securing tongues are readily bent back to straight positions whereupon the plate can be removed and replaced by another.

This method of securing a rubber protective member anywhere it may be used is applicable to many different types of articles, not necessarily, being limited a flat metal rubber covered plate. For instance, in Fig. 3 a rubber block 8 is shown in which is embedded a flat bar 9 of metal, the ends of which are turned at right angles to make attaching tongues 10, which may be passed through slits or slots in the member to which they are to be secured, and thereafter bent over the same as the tongues 2 and bent. This block member shown in Fig. 3 is particularly useful in protecting the curved recess now largely used in the front fender of an automobile in which a portion of an extra tire is received and when thus used, the tire rests upon the rubber 8 rather than against the painted or enameled fender and the finish of the fender is protected and preserved.

The invention described is very practical and useful. Molding and vulcanizing the rubber on the plate is easily accomplished and large quantity production may be had at low cost. The invention is defined in the appended claims and is to be considered comprehensive of all forms of construction coming within their scope.

I claim:

1. In a construction of the class described, a flat plate of sheet metal having integral elongated tongues struck therefrom and bent outwardly at substantially right angles, thereby providing openings through the plate at the places where the tongues are struck therefrom, said plate having a plurality of additional openings therethrough spaced from each other, and a rubber covering at both sides and around the edges of said plate, the opposite sides of the rubber covering having integral connecting portions extending through the openings in the plate.

2. A step plate for an automobile running board comprising, a flat plate of sheet metal having integral elongated tongues struck therefrom and bent outwardly at substantially right angles, thereby providing openings through the plate at the places where the tongues are struck therefrom, said plate having a plurality of additional openings therethrough spaced from each other, and a rubber covering at both sides and around the edges of said plate, the opposite sides of the rubber covering having integral connecting portions extending through the openings in the plate, said tongues being of sufficient length to extend through the rubber covering for the purpose described.

3. A step plate comprising, a flat plate of sheet metal having integral tongues struck therefrom and bent outwardly at substantially right angles, thereby providing spaces through the plate at the places where the tongues are struck therefrom, a rubber covering at both sides and around the edges of said plate, the opposite sides of the rubber covering having integral connecting portions extending through the spaces in the plate, said tongues being of sufficient length to extend through the rubber covering for the purpose described, and means for holding the rubber covering onto the plate at points intermediate the said spaces in the said plate.

4. In a construction of the class described, a flat metal plate having a plurality of integral tongues struck therefrom and extending outwardly at right angles, and a rubber covering entirely surrounding said plate at both sides and all edges thereof, said tongues extending through the covering at one side thereof.

In testimony whereof I affix my signature.

JAMES FRANCIS DUFFY.